United States Patent Office 3,259,458
Patented July 5, 1966

3,259,458
PROCESS FOR PREPARING WET PROCESS PHOSPHORIC ACID STABILIZED AGAINST IRON AND ALUMINUM PRECIPITATION
Alfred W. Petersen, Salt Lake City, and Walter Lyman Staker, Granger, Utah, assignors to Stauffer Chemical Company, New York, N.Y., a corporation of Delaware
No Drawing. Filed Oct. 6, 1965, Ser. No. 493,528
11 Claims. (Cl. 23—165)

This application is a continuation-in-part of our application S.N. 175,817 filed February 26, 1962, now forfeited.

This invention relates to the stabilization of acidic phosphate solutions. More particularly, the invention relates to a method to inhibit the formation of solids in so-called "wet process" phosphoric acid, produced by acidulation of phosphate rock or other phosphate-containing substance.

A conventional method for the production of aqueous acidic phosphate solution is the reaction of sulfuric acid with phosphate rock in a series of stirred tanks. The slurry that results contains a liquid phase consisting of phosphoric acid with dissolved impurities and with solid impurities consisting of calcium sulfate (gypsum), sodium fluosolicate, and other solid impurities. Filtration of the slurry yields crude dilute aqueous phosphoric acid which is the so-called "wet process" phosphoric acid.

The crude dilute acid in conventional practice contains about 15% to about 35% by weight of phosphorous pentoxide ($P_2O_5$) and is normally concentrated to a $P_2O_5$ content of at least 44% by weight and more commonly to at least 50% by weight. The concentration of the "wet process" acid can be accomplished in many ways which are obvious to those skilled in the art. For example, removal of free water from the crude dilute acid results in concentration and can be done by heating at sub-atmospheric, atmospheric or super atmospheric pressures; gas stripping; or chemically removing free water as by adding $P_2O_5$. In addition the concentration can be effected by reducing the free water concentration by mixing said crude dilute acid with phosphoric acids of higher concentration.

During the concentration process and during subsequent storage over a period of weeks to months, up to about 15% by weight of solids may be formed. The problems that result from the formation of solids are particularly serious with respect to "wet process" phosphoric acid. The solids settle to form a compact sludge in storage tanks which must be cleaned out, and the sludge must be recovered to make operation economical. Solids also precipitate and settle during subsequent shipment in tank cars to result in a phosphoric acid loss and in the payment of freight charges on the nonsaleable sludge.

The solids in "wet process" phosphoric acid are commonly removed by storage in unagitated tanks where the solids settle. The clarified acid is pumped off the top for shipment or other use. This method of clarification is suitable for some purposes, but solids continue to form and settle over a long period of time after clarification. The solids that form in the "wet process" phosphoric acid upon concentration and latter storage consist of a wide variety of inorganic compounds such as fluorides, fluosilicates, sulfates, salts of calcium, sodium and potassium and complex potassium phosphate containing iron and or aluminum. Most of these undesirable solids are completely precipitated during the concentration step or at worst during a short settling period after the "wet process" phosphoric acid has been concentrated. However, the complex iron and aluminum phosphate precipitation continues for exceedingly long periods of time. These iron and aluminum phosphate are believed to be molecularly designated as $Fe_3KH_{14}(PO_4)_8 \cdot 4H_2O$ and $$Al_3KH_{14}(PO_4)_8 \cdot 4H_2O$$

Many methods have been proposed for removing impurities from "wet process" phosphoric acid. Centrifugation may be used to remove solids, but post-precipitation is not practically eliminated. Filtration is not practical because of the slow filtration rate obtained with the viscous concentrated acid. Solvent extraction obtains a relatively pure phosphoric acid product but is very costly. The addition of swelling-type clay to prevent settling of the solids is effective to a degree, but the acid becomes very viscous and unattractive in appearance. Stabilization with an organic additive, such as specified in the patent to Wilson, No. 2,955,919, is effective in preventing post-precipitation but at considerable expense for treating chemicals.

Accordingly, it is an object of this invention to stabilize relatively concentrated acidic phosphate solutions and prevent post-precipitation of any appreciable quantity of solid impurities during shipment or storage. A further object of the invention is to inhibit the precipitation of solid impurities in a more economical manner than heretofore possible. A more specific object of the invention is to inhibit the post-precipitation of the iron and aluminum impurities normally incident in relatively concentrated "wet process" phosphoric acid.

Other objects and advantages of my invention, if not specifically set forth, will become obvious to those skilled in the art from the following description.

Generally, it has been discovered that the precipitation of solids originating from iron and aluminum impurities in "wet process" phosphoric acid which has been concentrated to within the range 44–59 weight percent $P_2O_5$ is inhibited by the addition thereto of a phosphoric acid-soluble inorganic alkaline material such as ammonia, ammonium hydroxide, potassium hydroxide, potassium carbonate, sodium hydroxide, sodium carbonate, magnesium oxide, magnesium hydroxide and magnesium carbonate or mixtures thereof in quantities of between about 0.20 and 1.00 gram equivalent of the said alkaline material per gram mole of $P_2O_6$. Too small a quantity does not provide effective inhibition, while too large quantities cause the acid to solidify. The use of the additive is not necessary where the acid contains less than 44% $P_2O_5$ since iron and aluminum impurities do not precipitate from such weak acid, while the addition of such materials to acid containing more than about 59% $P_2O_5$ is not recommended because of the high viscosity obtained. The foregoing list is not exclusive, but merely covers the compounds which are sufficiently inexpensive to be employed in the practice of the invention.

The preferred additives are ammonia, ammonium hydroxide, potassium hydroxide and sodium hydroxide because of cost and other considerations which will appear immediately hereinafter. The preferred range for each of these four materials is between about 0.40 and 0.80 gram equivalent per gram mole of $P_2O_5$ in the acid.

These figures represent proper amounts of additives for ordinary commercially available "wet process" phosphoric acid, that is, phosphoric acid containing customary quantities of iron and aluminum impurities.

The amount of alkaline additive required is dependent upon the amount of iron and aluminum impurities present in the acid and it has been found that about six moles of the $H_2PO_4^-$ (formed by the reaction of $H_3PO_4$ and an alkaline material) are required for each mole of iron or aluminum cation whereby to form either the $Fe(H_2PO_4)_6^{---}$ or the $Al(H_2PO_4)_6^{---}$ complex which is soluble in acid within the 44–59% $P_2O_5$ range. Thus, an alternative way of expressing the preferred quantity of additive is to state that at least about 6 gram equivalents of the $H_2PO_4^-$ ion already in the acid should be added per gram mole of iron and aluminum impurity therein. The amount of the $H_2PO_4^-$ ion is dependent upon the quantity of impurities, such as sodium compounds or sulfuric acid, already present in the acid and may be accurately determined by analysis of the significant impurities, the effect of various impurities on the formation of the $H_2PO_4^-$ ion being well understood. As a practical matter, the optimum quantity of alkaline additive required for the practice of the invention with most commercially available "wet process" phosphoric acids will fall within the range 5–7 gram equivalents and will most certainly fall within the range 2–9 gram equivalents of alkaline additive per gram mole of iron and aluminum impurity in the acid.

Certain of the alkaline additives, such as ammonia, ammonium hydroxide, potassium hydroxide, and potassium carbonate, contain marketable fertilizer constituents, such as nitrogen and potash. A preferred, economical embodiment of this invention is to utilize one of the marketable fertilizer constituents as the additive for the many cases where credit could be obtained for the value of the alkaline additive. Even in cases where credit cannot be obtained, the value of the phosphoric acid is enhanced by the nonsludging property.

The alkaline additive may be put into the phosphoric acid in any convenient manner. The addition may be performed before, during or after the process of concentrating weak phosphoric acid to the 44–59% $P_2O_5$ level, and either before or after removing the precipitated solids. In any event, precipitated solids from impurities, such as fluorides, fluosilicates, sulfates, and dissolved salts of calcium, sodium and potassium, must be removed after concentration by conventional means, such as settling, centrifuging, etc. The resulting clarified acidic phosphate solution is found to be stabilized to the further post-precipitation of iron and aluminum impurities when the requisite amount of alkaline additive is present therein.

In another mode of operation, the phosphoric acid may be aged after concentration for up to 14 days or even longer, and then be clarified by filtration, centrifuging, etc. With this method, a smaller amount of the alkaline component is required to obtain a stabilized acidic phosphate solution, since during aging a portion of the precipitatable iron and aluminum would precipitate and be removed by normal clarification. After aging normal "wet process" concentrated phosphoric acid for 14 days, approximately 5–30% of the total iron and aluminum has been precipitated. Theoretically, if concentrated "wet process" acid were allowed to age a sufficiently long length of time, all of the precipitatable iron and aluminum would precipitate and after clarification no further precipitation would occur. However, such would not be practical due to the voluminous excess storage or ageing facilities that would be required.

It may be desirable to provide some cooling of the acid by conventional means during the addition of the alkaline component. A preferred embodiment of the invention is to restrict cooling such that the acid temperature exceeds about 225° F. for at least about 15 minutes, under which conditions any precipitated iron and aluminum not removed by clarification will redissolve and remain stabilized against post-precipitation. But restricting of the cooling is not necessary to the success of this invention. An acidic phosphate solution stabilized against further post-precipitation of iron and aluminum is obtained whether the acid is or is not cooled.

The following examples are given to illustrate the effectiveness of the invention; but it is understood that these examples are only illustrative and do not limit the scope of the invention.

*Example 1*

A fresh sample of "wet process" phosphoric acid was clarified by settling for one day. Samples of the clear, settled acid (52.5% $P_2O_5$) were decanted and were partially neutralized with various amounts of anhydrous ammonia ($NH_3$). After the samples cooled for one day, 0.05 weight percent of dried solids settled from another acid sample were added to induce crystallization. After 12 days of settling, the settled solids were filtered, washed with a mixture of dioxane and water, and dried. Effective inhibition (see Table I) of precipitation was obtained for 3.8% $NH_3$ and 5.1% $NH_3$. In the latter case, part of the added solids dissolved. The large amount of solids formed or the solidification of the sample in other cases illustrates the importance of the correct amount of additive.

TABLE I

| Weight percent of $NH_3$ | Gram equivalents of $NH_3$ per gram mole of $P_2O_5$ | Net weight percent of dry solids |
| --- | --- | --- |
| 0.0 | 0.00 | 3.22 |
| 1.2 | 0.19 | 2.82 |
| 2.5 | 0.41 | 0.75 |
| 3.8 | 0.63 | 0.04 |
| 5.1 | 0.85 | −0.02 |
| 6.5 | 1.11 | (¹) |
| 7.9 | 1.36 | (¹) |

¹ Sample solidified.

*Example 2*

The fresh sample of "wet process" prosphoric acid of the same type used in example 1 was clarified by settling for one day. A sample of the clear, settled acid (52.5% $P_2O_5$) was decanted and partially neutralized with anhydrous ammonia to 3.8% $NH_3$. To various fractions of the acid, water was added or was removed by boiling. After the sample cooled for one day, 0.05 weight percent of dried solids settled from another acid sample were added. After 12 days of settling, the solids were filtered, washed, with a mixture of dioxane and water and dried. The effective inhibition (see Table II) of precipitation obtained in all of the samples illustrates that the effect of the additive is independent of $P_2O_5$ concentration over a wide range.

TABLE II

| Weight percent of $P_2O_5$ | Gram equivalents of $NH_3$ per gram mole of $P_2O_5$ | Net weight percent of dried solids |
| --- | --- | --- |
| 44.1 | 0.63 | 0.00 |
| 47.1 | 0.63 | 0.02 |
| 50.1 | 0.63 | 0.04 |
| 53.1 | 0.63 | −0.01 |
| 56.1 | 0.63 | 0.00 |
| 59.1 | 0.63 | −0.05 |

*Example 3*

A fresh sample of dilute "wet process" phosphoric acid (27% $P_2O_5$) was clarified by settling for one day. Samples of the clear, settled acid were partially neutralized with anhydrous ammonia, and the resulting mixture was concentrated to 52% $P_2O_5$ by boiling. After the samples cooled for one day, 0.1 weight percent of dried solids settled from another sample were added. After 12 days of settling, the solids were filtered, washed with a mixture of dioxane and water and dried. All of the samples (see Table III) contained an appreciable amount of the solids. This example illustrates that partial neutralization does not effectively inhibit the formation of some types of solids present in dilute acid, such as calcium sulfate (gypsum), sodium fluosilicate, etc. Partial neutralization in Examples 1 and 2 inhibits the precipitation of iron and aluminum impurities.

TABLE III

| Weight percent of $NH_3$ | Gram equivalents of $NH_3$ per gram mole of $P_2O_5$ | Net weight percent of dry solids |
|---|---|---|
| 0.0 | 0.00 | 2.22 |
| 2.4 | 0.39 | 3.33 |
| 4.9 | 0.79 | 0.62 |

*Example 4*

Substantially the same procedure as given in Example 3 was followed, except that the starting acid was about 43% $P_2O_5$ and potassium hydroxide (KOH) was used for partial neutralization. The results show that effective inhibition of precipitation is obtained if sufficient additive is used.

TABLE IV

| Weight percent of KOH | Gram equivalents of KOH per gram mole of $P_2O_5$ | Net weight percent of dry solids |
|---|---|---|
| 0.0 | 0.00 | 1.40 |
| 6.1 | 0.30 | 2.90 |
| 8.1 | 0.39 | 2.70 |
| 12.1 | 0.59 | 0.21 |

*Example 5*

Substantially the same procedure as given in Example 3 was followed, except that the starting acid was about 43% $P_2O_5$ and sodium hydroxide (NaOH) was used for partial neutralization. The results show that effective inhibition of precipitation is obtained if sufficient additive is used.

TABLE V

| Weight percent of NaOH | Gram equivalents of NaOH per gram mole of $P_2O_5$ | Net weight percent of dry solids |
|---|---|---|
| 0.0 | 0.00 | 1.40 |
| 4.7 | 0.32 | 0.62 |
| 7.0 | 0.48 | 0.37 |
| 9.4 | 0.64 | 0.01 |

*Example 6*

A fresh sample of concentrated "wet process" phosphoric acid was clarified by centrifugation. The clear acid (53.1% $P_2O_5$) sample, from which about 3% of the original iron and aluminum had precipitated, was partially neutralized with various amounts of anhydrous ammonia ($NH_3$). The treatment was continued as in Example 1. Effective inhibition of precipitation (see Table VI) was obtained for 3.8% $NH_3$ and 5.1% $NH_3$.

TABLE VI

| Weight percent of $NH_3$ | Gram equivalents of $NH_3$ per gram mole of $P_2O_5$ | Net weight percent of dry solids |
|---|---|---|
| 0.0 | 0.00 | 4.18 |
| 1.2 | 0.19 | 3.62 |
| 2.5 | 0.41 | 0.98 |
| 3.8 | 0.63 | 0.09 |
| 5.1 | 0.85 | 0.02 |
| 6.5 | 1.11 | (¹) |
| 7.9 | 1.36 | (¹) |

¹ Sample solidified.

*Example 7*

A fresh sample of concentrated "wet process" phosphoric acid was clarified by settling for 14 days. Samples of the clear, settled acid (53.5% $P_2O_5$), from which about 22% of the original iron and aluminum had precipitated, were decanted and treated as in Example 1. Effective inhibition (see Table VII) of precipitation was obtained for 2.5% $NH_3$, 3.8% $NH_3$, and 5.1% $NH_3$.

TABLE VII

| Weight percent of $NH_3$ | Gram equivalents of $NH_3$ per gram mole of $P_2O_5$ | Net weight percent of dry solids |
|---|---|---|
| 0.0 | 0.00 | 0.40 |
| 1.2 | 0.19 | 0.26 |
| 2.5 | 0.41 | 0.04 |
| 3.8 | 0.63 | 0.02 |
| 5.1 | 0.85 | −0.03 |
| 6.5 | 1.11 | (¹) |
| 7.9 | 1.36 | (¹) |

¹ Sample solidified.

*Example 8*

A fresh sample of concentrated "wet process" phosphoric acid was clarified by centrifuging after a 7-day aging period. The clear acid (53.4% $P_2O_5$), from which about 20% of the original iron and aluminum had precipitated, was treated as in Example 1. Effective inhibition of precipitation (see Table VIII) was obtained for 2.5% $NH_3$, 3.8% $NH_3$, and 5.1% $NH_3$.

TABLE VIII

| Weight percent of $NH_3$ | Gram equivalents of $NH_3$ per gram mole of $P_2O_5$ | Net weight percent of dry solids |
|---|---|---|
| 0.0 | 0.0 | 0.52 |
| 1.2 | 0.19 | 0.30 |
| 2.5 | 0.41 | 0.04 |
| 3.8 | 0.63 | 0.00 |
| 5.1 | 0.85 | 0.02 |
| 6.5 | 1.11 | (¹) |
| 7.9 | 1.36 | (¹) |

¹ Sample solidified.

Various modifications of the invention without departing from the spirit thereof will become apparent to those skilled in the art. Hence, it is desired that limitations on the invention be set only by the appended claims.

We claim:

1. A process for preparing a "wet process" phosphoric acid containing iron and aluminum impurities, but stabilized against precipitation of said iron and aluminum impurities comprising:
    (a) clarifying a concentrated crude "wet process" phosphoric acid having a $P_2O_5$ level of between about 44 and 59 weight percent $P_2O_5$ which contains iron and aluminum impurities which would precipitate on standing,
    (b) and adding to the crude "wet process" phosphoric acid either before or after clarification, in a quantity of between about 0.20 and 1.00 gram equivalent per mole of $P_2O_5$ in the said acid, a compound selected from the class consisting of ammonia, ammonium hydroxide, potassium hydroxide, potassium carbonate, sodium hydroxide, sodium carbonate, magnesium oxide, magnesium hydroxide, and magnesium carbonate, said addition being in an amount sufficient to stabilize the "wet process" phosphoric acid against precipitation of iron and aluminum impurities therefrom.

2. The process of claim 1 wherein the said compound added is ammonia.

3. The process of claim 1 wherein the said compound added is sodium hydroxide.

4. The process of claim 1 wherein the said compound added is potassium hydroxide.

5. A process of preparing a "wet process" phosphoric acid containing iron and aluminum impurities but stabilized against precipitation of said iron and aluminum impurities comprising:
    (a) concentrating crude "wet process" phosphoric acid to a $P_2O_5$ level of between about 44 and 59 weight percent $P_2O_5$;

(b) clarifying said acid after substantially all of the precipitates other than iron or aluminum are formed and a substantial percentage of the total iron and aluminum impurities therein still remain, (c) and adding to the said "wet process" phosphoric acid, in a quantity of between about 2 and 9 gram equivalents per mole of iron and aluminum impurities in the said acid, a compound selected from the class consisting of ammonia, ammonium hydroxide, potassium hydroxide, potassium carbonate, sodium hydroxide, sodium carbonate, magnesium oxide, magnesium hydroxide and magnesium carbonate, said addition being made at any time before or after concentration.

6. A process for preparing a "wet process" phosphoric acid containing iron and aluminum impurities but stabilized against precipitation of said iron and aluminum impurities comprising:

(a) adding to crude "wet process" phosphoric acid having a $P_2O_5$ level of less than 44 weight percent, in a quantity of between about 0.20 and 1.00 gram equivalent per mole of $P_2O_5$ in the said acid, a compound selected from the class consisting of ammonia, ammonium hydroxide, potassium hydroxide potassium carbonate, sodium hydroxide, sodium carbonate, magnesium oxide, magnesium hydroxide, and magnesium carbonate; said addition inhibiting any substantial precipitation of iron and aluminum impurities therefrom;

(b) concentrating said crude "wet process" phosphoric acid to a $P_2O_5$ level of between 44 and 59 weight percent $P_2O_5$;

(c) and clarifying said acid after substantially all of the precipitates other than iron and aluminum are formed while substantial quantities of the said iron and aluminum impurities remain, which would precipitate on standing, if said acid were not inhibited against such precipitation.

7. The process of claim 6 wherein the said compound added is ammonia.

8. The process of claim 6 wherein the said compound added is sodium hydroxide.

9. The process of claim 6 wherein the said compound added is potassium hydroxide.

10. A process for preparing a "wet process" phosphoric acid containing iron and aluminum impurities, but stabilized against precipitation of said iron and aluminum impurities comprising:

(a) clarifying a concentrated crude "wet process" phosphoric acid having a $P_2O_5$ level of between about 44 and 59 weight percent $P_2O_5$ by permitting the said acid to stand for up to about 14 days, said period being sufficient to permit the settling therefrom of various solid impurities but said period being insufficient to settle out any substantial fraction of the total iron and aluminum impurities therein;

(b) and adding to the said clarified "wet process" phosphoric acid so formed, in a quantity of between about 2 and 9 gram equivalents per mole of iron and aluminum impurities in the said acid, a compound selected from the class consisting of ammonia, ammonium hydroxide, potassium hydroxide, potassium carbonate, sodium hydroxide, sodium carbonate, magnesium oxide, magnesium hydroxide and magnesium carbonate, said addition being in an amount sufficient to stabilize the "wet process" phosphoric acid against precipitation of iron and aluminum impurities therefrom.

11. A process for preparing a "wet process" phosphoric acid containing iron and aluminum impurities but stabilized against precipitation of said iron and aluminum impurities comprising:

(a) concentrating crude "wet process" phosphoric acid to a $P_2O_5$ level of between about 44 and 59 weight percent $P_2O_5$;

(b) clarifying said acid by permitting the said acid to stand for a period of time sufficient to permit the precipitation therefrom of various solid impurities but for a period of time insufficient to settle out a substantial fraction of the total iron and aluminum impurities therein;

(c) and adding to the clarified "wet process" phosphoric acid so formed, in a quantity of between about 0.20 and 1.00 gram equivalent per mole of $P_2O_5$ in the said acid, a compound selected from the class consisting of ammonia, ammonium hydroxide, potassium hydroxide, potassium carbonate, sodium hydroxide, sodium carbonate, magnesium oxide, magnesium hydroxide, and magnesium carbonate, said addition being in an amount sufficient to stabilize said clarified "wet process" phosphoric acid against precipitation of iron and aluminum impurities therefrom.

References Cited by the Examiner

UNITED STATES PATENTS

| | | | |
|---|---|---|---|
| 1,676,556 | 7/1928 | Howard | 23—165 |
| 3,057,711 | 10/1962 | Reusser et al. | 23—165 X |

MILTON WEISSMAN, *Primary Examiner.*

O. F. CRUTCHFIELD, *Assistant Examiner.*